2,798,026
STERILIZATION OF MEDIA

Jacob S. Cash, Syracuse, and Alden B. Hatch, Fayetteville, N. Y., assignors to Bristol Laboratories Inc., Syracuse, N. Y., a corporation of New York No Drawing. Application October 21, 1953, Serial No. 387,507

6 Claims. (Cl. 195—101)

This invention relates to an improvement in the process for the production of antibiotics by fermentation and more particularly to an improvement in methods of sterilization of the fermentation media.

Penicillin is an extremely potent bacteriostatic agent produced by the metabolism of *Penicillium notatum* or *Penicillium chrysogenum* when grown in selected nutrient media. The original work of Fleming (British Exp. Path. J., 10, 226 (1929)) and the work of Abraham et al. (Lancet, 2, 226 (1940); Lancet 2, 177 (1941)) described the culture of *Penicillium notatum* and the properties of penicillin. More recently, *Penicillium chrysogenum* has been grown in submerged culture, i. e. by incubating the mold while it is submerged in a liquid nutrient medium and the latter is aerated. This method is obviously better adapted for the large-scale commercial production of penicillin.

Liquid nutrient media of various compositions have been employed heretofore in the production of penicillin by mold growth, the media generally comprising nutrient salts, carbohydrate assimilable by the mold and a source of nitrogen. The last includes various meals and flours and corn-steep liquors. Despite the wide variation in the ingredients used in this media, it is true in all cases that the media must be sterilized before fermentation. Failure to sterilize the media markedly reduces or abolishes the yield of penicillin. Contamination by bacteria is certain to take place during the preparation of media and subsequent fermentation on an industrial scale and the growth of the bacteria will produce penicillinase, alter the pH of the media, consume the oxygen and nutrients and othewise reduce or even prevent the final isolation of penicillin. In the past, it has been necessary to hold the media at a temperature of about 245°–255° F. for approximately 30 minutes to effect sterilization. Steam pressures in the range of 15 pounds per square inch gage (about 120° C. or 248° F.) are commonly used in the laboratory and also in plant operations. The temperature in the interior of the media is slow to reach the desired temperature and this necessitates long periods of heating. The solids or semi-solid materials also cool relatively slowly after heating is discontinued and are thus held at a high temperature for protracted periods. This process is expensive, time-consuming and also causes the decomposition of the more heat-sensitive components of the media.

Several reports are available which describe the destruction by heat of the nutritional qualities of natural materials. Lankford and Lacy, presented before the Meeting of Soc. of Amer. Bacteriologists, Cincinnati, Ohio (May 1949), reported the destruction of cystine and other amino acids essential for microbial growth, when they are sterilized in a medium containing glucose. G. Toennies and D. L. Gallant, J. Biol. Chem., 174, 451 (1948) stated that heat sterilization of the medium adversely affects the subsequent growth of bacteria. R. J. Evans and H. A. Butts, Science, 109, 569 (1949), found that when soybean meal is heated alone, few of the amino acids are destroyed. However, when heated with sucrose in the medium, over 40% of the diamino acids, lysine and arginine, are destroyed. This destruction is said to be caused chiefly by the reaction of free amino groups with sucrose. Other workers have shown that methionine is readily destroyed when heated in the presence of glucose, but it is not affected in the presence of starch or dextrin (W. D. Graham et al., Science 110, 217 (1949), and P. T. Hsu et al., Poultry Sci., 27, 668 (1948)).

Deseive, Milchwissenschaft, 2, 141–49 (1947) reported that the production of riboflavin by *Eremothecium ashbyii* is dependent on a heat labile factor which is destroyed by extended sterilization of the medium. F. W. Tanner et al., J. Bact. 58, 739 (1949) obtained riboflavin yields with *Ashbya gossypii* of 248γ per ml. when the medium was autoclaved for 90 minutes and 648γ per ml. when autoclaved for 15 minutes. Tanner (V. F. Pfeifer, F. W. Tanner Jr., Charles Vojnovich and D. H. Traufler, Ind. Eng. Chem. 42 (9), 1176–1781 (1950)), also found that in the production of riboflavin by submerged culture of *Ashbya gossypii*, the medium was easily overcooked by batch sterilization in the fermentor with subsequent impairment of riboflavin yields. This medium included corn steep liquor. The process involved direct injection of steam to hold the medium at 121° C. for 30 minutes followed by cooling by circulating cold water through jackets of the tank. Tanner et al. concluded that excessive heating destroys or alters unknown constituents of the media.

Melanoidin compounds are formed by the reaction of amino acids and sugars at high temperatures (V. L. Kretovich et al., Biokhimiya 13, 508 (1948)). Patton et al. (Science 107, 623–624 (1948)) have shown that heat processing of foods or feeds in the presence of reducing sugar results in partial inactivation of free amino acids, amino vitamins and at least three essential amino acids in protein.

It is evident that the chief effect of heat is to cause unfavorable reactions between carbohydrates and the free amino acids or the free amino groups in proteins.

An object of the present invention is to provide a process for the sterilization of fermentation media used in antibiotic production which minimizes that decomposition of essential, heat-sensitive components of the media which is reflected in decreased yields.

Another object of the present invention is to provide a process for the sterilization of fermentation media used in penicillin production which is suitable for large-scale use.

A further object of the present invention is to provide a process for the sterilization of fermentation media used in penicillin production which minimizes that decomposition of essential, heat-sensitive components which is produced by batch-sterilization in bulk with steam under super-atmospheric pressure.

There has now been discovered, according to the present invention, in the method of producing antibiotics by fermentation which comprises inoculating a sterile, liquid nutrient medium, incubating the inoculated medum and harvesting the antibiotic, the step which comprises sterilizing the medium before inoculation by raising its temperature rapidly to between 250° F. and 320° F., maintaining the medium briefly at a temperature of 250° F. to 320° F. and finally cooling the medium rapidly to below 90° F.

A more comprehensive understanding of this invention is obtained by reference to the following examples. All temperatures are given in degrees Fahrenheit.

EXAMPLE I

A medium containing 4% corn steep liquor, 1.75% lactose, 0.025% $MgSO_4$, .043% $KH_2PO_4$, 0.25% $NaNO_3$, 0.003% ZnSO4, 0.5% CaCO3, and 0.3% phenylacetic acid was sterilized in one batch in each run by passing steam through internal coils and jackets until the temperature of the medium was between 245° and 255° F., holding this temperature for thirty minutes and finally cooling the medium to the desired fermentation temperature of about 75° F. The medium was fermented after inoculation with Penicillium chrysogenum Q-176 with the usual aeration and stirring. The broth was assayed for penicillin at the end of 89 hours with the results shown in Table I.

Table I

| Run No. | Bio-Assay in Oxford units Per ml. | |
|---|---|---|
| | Staph. | B. subt. |
| 1 | 673 | 532 |
| 2 | 678 | 500 |
| 3 | 558 | 461 |
| 4 | 583 | 572 |
| 5 | 599 | 518 |
| 6 | 702 | 614 |
| Average | 632 | 533 |

EXAMPLE II

Fermentations were carried out which were identical with those of Example I in all respects except the manner of sterilization. In this case, the medium was sterilized in a small, continuous stream by direct injection of steam with some use of external, heated jackets, using the times and temperatures given in Table II.

Table II

| Run No. | Sterilization | | Cooling | | Time Held at About the Lower Temperature in Seconds | Bio-Assay in Oxford units per ml. | |
|---|---|---|---|---|---|---|---|
| | Temp., °F. | Time in sec. | To Temp., °F. | In Time in sec. | | Staph. | B. subt. |
| 1 | 294 | 144 | 221 | 1 | 102 | 853 | 756 |
| 2 | 295 | 25 | 200 | 44 | 100 | 805 | 683 |
| 3 | 287 | 50 | 203 | 38 | 81 | 737 | 590 |
| 4 | 294 | 25 | 193 | 38 | 103 | 1,284 | 983 |
| 5 | 293 | 26 | 195 | 32 | 69 | 974 | 792 |
| 6 | 289 | 26 | 197 | 32 | 68 | 1,207 | 916 |
| 7 | 288 | 25 | 100 | 30 | | 1,045 | 732 |
| Average | | | | | | 986 | 779 |

It is apparent that the use of the method of sterilization of Example II markedly increased the concentration of penicillin in the broth at the end of the fermentation.

The medium to be sterilized is raised from room temperature to between 250° F. and 320° F. very rapidly, e. g. over a period of less than ten seconds. The material is then held at the desired temperature between 250° F. and 320° F. for a period of from 0.1 to 150 seconds. For any given combination of time and temperature, e. g. 270° F. and 6 seconds, roughly equivalent results may be obtained by using a temperature 18° F. higher and one-half the time, e. g. 288° F. and 3 seconds. Examples of preferred times and temperatures in media for penicillin production are 300° F., 0.1 sec.; 290° F., 3 sec.; 275° F., 10 sec.; 265° F., 20 sec. The preferred choice of temperature and time within this range will depend upon the medium and apparatus used and can easily be determined by one skilled in the art. For a given apparatus, it is usually more economical to vary the temperature, as a decrease in contact time requires mechanical changes either to increase the capacity of the pumps used to circulate the medium or to decrease the size of the holding chamber. The objective is to sterilize the medium by use of the lowest practical time and temperature. The medium is next cooled rapidly to about 200° F. over a period of less than ten seconds and preferably over a period of about three seconds and then further cooled to approximately the temperature to be used in the fermentation (e. g. below 90° F.).

The process of the present invention is equally useful for the sterilization of media used in the production of other antibiotics, e. g. streptomycin, bacitracin, polymixin, neomycin, aureomycin, chloramphenicol, terramycin, tetracycline, netropsin, hydroxystreptomycin, viomycin, thiolutin, fumagillin, and the like.

Advantages of the present process over the slow batch sterilization of the prior art are the increased yield of penicillin, the steady, predictable drain on the steam boilers and the elimination of violent fluctuations in steam use, the possibility of running the outgoing medium counter-current to incoming medium to conserve heat and the marked reduction in time of cooling, which cuts down the cycle time and permits more batches to be fermented in a given tank when the process of this invention is used. An additional advantage is that it is possible to inoculate the tank when only partially filled. There is a reduction of the time when the fermentation tank is idle (down time) because less time is required to sterilize the tank and start the fermentation.

Equivalent rapid heating and cooling is produced without direct injection of steam by the use of equipment such as that described by Wilhelm E. Mallory in U. S. Patent, 2,270,540.

Additional information on methods and results of continuous sterilization of media in biochemical processes is given by Pfeifer and Vojnovich, Ind. Eng. Chem., 44, 1940–1946 (August 1952).

We claim:

1. In the method of producing antibiotics by fermentation which comprises inoculating a sterile, liquid nutrient medium, incubating the inoculated medium and harvesting the antibiotic, the step which comprises sterilizing the medium in a stream before inoculation by raising its temperature in less than ten seconds to between 270° F. and 290° F., maintaining the medium for from three to six seconds at a temperature between 270° F. and 290° F. and finally cooling the medium in less than ten seconds to below 200° F.

2. In the method of producing penicillin by fermentation which comprises inoculating a sterile, liquid nutrient medium, incubating the inoculated medium and harvesting the penicillin, the step which comprises sterilizing the medium in a stream before inoculation by raising its temperature in less than ten seconds to between 270° F. and 290° F., maintaining the medium for from three to six seconds at a temperature between 270° F. and 290° F. and finally cooling the medium in less than ten seconds to below 200° F.

3. In the method of producing streptomycin by fermentation which comprises inoculating a sterile, liquid nutrient medium, incubating the inoculated medium and harvesting the streptomycin, the step which comprises sterilizing the medium in a stream before inoculation by raising its temperature in less than ten seconds to between 270° F. and 290° F., maintaining the medium for from three to six seconds at a temperature between 270° F. and 290° F. and finally cooling the medium in less than ten seconds to below 200° F.

4. In the method of producing chlorotetracycline by fermentation which comprises inoculating a sterile, liquid nutrient medium, incubating the inoculated medium and harvesting the chlorotetracycline, the step which comprises sterilizing the medium in a stream before inoculation by raising its temperature in less than ten seconds to between 270° F. and 290° F., maintaining the medium for from three to six seconds at a temperature between 270° F. and 290° F. and finally cooling the medium in less than ten seconds to below 200° F.

5. In the method of producing oxytetracycline by fermentation which comprises inoculating a sterile, liquid nutrient medium, incubating the inoculated medium and harvesting the oxytetracycline, the step which comprises sterilizing the medium in a stream before inoculation by raising its temperature in less than ten seconds to between 270° F. and 290° F., maintaining the medium for from three to six seconds at a temperature between 270° F. and 290° F. and finally cooling the medium in less than ten seconds to below 200° F.

6. In the method of producing tetracycline by fermentation which comprises inoculating a sterile, liquid nutrient medium, incubating the inoculated medium and harvesting the tetracycline, the step which comprises sterilizing the medium in a stream before inoculation by raising its temperature in less than ten seconds to between 270° F. and 290° F., maintaining the medium for from three to six seconds at a temperature between 270° F. and 290° F. and finally cooling the medium in less than ten seconds to below 200° F.

References Cited in the file of this patent

UNITED STATES PATENTS

| | | |
|---|---|---|
| 2,170,196 | Grindrod | Aug. 22, 1939 |
| 2,270,540 | Mallory | Jan. 20, 1942 |
| 2,423,580 | Carnarius | July 8, 1947 |
| 2,478,748 | De Boer | Aug. 9, 1949 |
| 2,482,065 | Duggar | Sept. 13, 1949 |

FOREIGN PATENTS

| | | |
|---|---|---|
| 138,803 | Australia | Sept. 25, 1950 |
| 691,411 | Great Britain | May 13, 1953 |

OTHER REFERENCES

Porter: Bacterial Chemistry and Physiology, Wiley, 1946, page 193.